United States Patent
Mullooly et al.

(10) Patent No.: US 9,294,393 B1
(45) Date of Patent: Mar. 22, 2016

(54) INTERCONNECTING VIRTUAL PRIVATE NETWORKS

(71) Applicant: CISCO TECHNOLOGY, INC., San Jose, CA (US)

(72) Inventors: John Mullooly, Colts Neck, NJ (US);
Fabio Maino, Palo Alto, CA (US);
Darrel Lewis, San Mateo, CA (US);
Gregg Schudel, Coronado, CA (US)

(73) Assignee: Cisco Technology, Inc., San Jose, CA (US)

(*) Notice: Subject to any disclaimer, the term of this patent is extended or adjusted under 35 U.S.C. 154(b) by 163 days.

(21) Appl. No.: 14/259,373

(22) Filed: Apr. 23, 2014

Related U.S. Application Data

(63) Continuation-in-part of application No. 14/155,190, filed on Jan. 14, 2014.

(60) Provisional application No. 61/817,582, filed on Apr. 30, 2013.

(51) Int. Cl.
  *H04L 12/715* (2013.01)
  *H04L 12/24* (2006.01)
  *H04L 12/911* (2013.01)

(52) U.S. Cl.
  CPC ............ *H04L 45/64* (2013.01); *H04L 41/0659* (2013.01); *H04L 41/0853* (2013.01); *H04L 41/12* (2013.01); *H04L 47/825* (2013.01)

(58) Field of Classification Search
  None
  See application file for complete search history.

(56) References Cited

U.S. PATENT DOCUMENTS

| | | | |
|---|---|---|---|
| 7,636,321 B1* | 12/2009 | Iannaccone | H04L 43/0864 370/252 |
| 8,166,205 B2 | 4/2012 | Farinacci et al. | |
| 2004/0165600 A1* | 8/2004 | Lee | H04L 12/4645 370/395.53 |
| 2007/0226325 A1* | 9/2007 | Bawa | H04L 12/4641 709/223 |
| 2008/0049621 A1* | 2/2008 | McGuire | H04L 12/24 370/236.2 |
| 2008/0159309 A1* | 7/2008 | Sultan | H04L 12/2852 370/401 |
| 2009/0016365 A1* | 1/2009 | Sajassi | H04L 45/02 370/401 |
| 2009/0059914 A1* | 3/2009 | Khalid | H04L 12/2854 370/389 |
| 2012/0176934 A1 | 7/2012 | Farinacci et al. | |
| 2012/0180122 A1* | 7/2012 | Yan | H04L 29/12028 726/15 |
| 2014/0156848 A1* | 6/2014 | Uttaro | H04L 29/08171 709/226 |
| 2014/0269702 A1* | 9/2014 | Moreno | H04L 45/64 370/390 |

OTHER PUBLICATIONS

IETF RFC 3931, "Layer Two Tunneling Protocol—Version 3 (L2TPv3)", J. Lau, Ed., Mar. 2005.
IETF RFC 2784, "Generic Routing Encapsulation (GRE)", D. Farinacci, Mar. 2000.

\* cited by examiner

*Primary Examiner* — Gary Mui
(74) *Attorney, Agent, or Firm* — Cindy Kaplan

(57) ABSTRACT

In one embodiment, a method includes receiving from a plurality of customer edge devices, endpoint addresses at a central mapping system operating as a control plane for a provider network in communication with a plurality of customer networks, and mapping the endpoint addresses to provider edge devices in the provider network. Wherein the customer edge devices store customer endpoint routes for active flows and the provider edge devices store customer edge device site locator addresses for use in a mapping and encapsulation overlay in the provider network. An apparatus and logic are also disclosed herein.

20 Claims, 10 Drawing Sheets

INTERCONNECTING VIRTUAL PRIVATE NETWORKS

STATEMENT OF RELATED APPLICATIONS

The present application claims priority from U.S. Provisional Application No. 61/817,582, entitled NETWORK VIRTUALIZATION, filed on Apr. 30, 2013 and is a continuation-in-part of U.S. patent application Ser. No. 14/155,190, entitled INTERCONNECTING VIRTUAL PRIVATE NETWORKS, filed on Jan. 14, 2014. The contents of both applications are incorporated herein by reference in their entirety.

TECHNICAL FIELD

The present disclosure relates generally to communication networks, and more particularly, to interconnecting virtual private networks.

BACKGROUND

Large Service Providers (SPs) often relay on large MPLS (Multiprotocol Label Switching) infrastructures to provide VPN (Virtual Private Network) services to customers.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
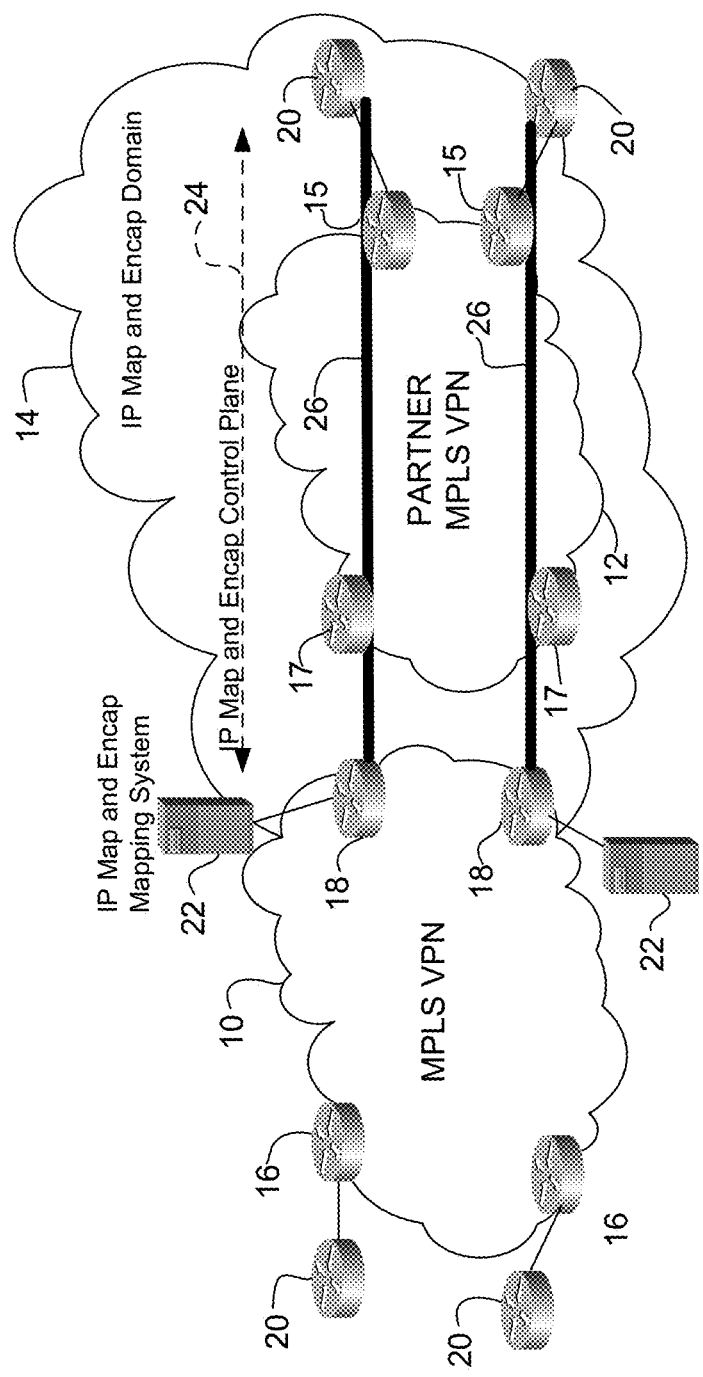
FIG. 1 illustrates an example of a network in which embodiments described herein may be implemented.

In one embodiment, a method generally comprises receiving from a plurality of customer edge devices, endpoint addresses at a central mapping system operating as a control plane for a provider network in communication with a plurality of customer networks, and mapping the endpoint addresses to provider edge devices in the provider network. Wherein the customer edge devices store customer endpoint routes for active flows and the provider edge devices store customer edge device site locator addresses for use in a mapping and encapsulation overlay in the provider network.

In another embodiment, an apparatus generally comprises a processor for processing endpoint addresses received from a plurality of customer edge devices at a central mapping system operating as a control plane for a provider network in communication with a plurality of customer networks, and mapping the endpoint addresses to provider edge devices in the provider network. The apparatus further comprises memory for storing the endpoint addresses. Wherein the customer edge devices store customer endpoint routes for active flows and the provider edge devices store customer edge device site locator addresses for use in a mapping and encapsulation overlay in the provider network.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

MPLS (Multiprotocol Label Switching) infrastructures are used to provide VPN (Virtual Private Network) services to customers that span across the globe. While the span of conventional SP (Service Provider) MPLS networks may be large, they are not truly global. When customer demand grows within a region where an SP does not have a Point of Presence (PoP) and where it does not make economic sense for the SP to invest directly in new network infrastructure within the region, the SP is typically forced into partnering relationships with other local or regional SPs that do have a PoP in that region. From a technical perspective, this results in a need for the primary SP (i.e., the one owning the customer relationship) and the partner SP (i.e., the one with the local or regional PoP) to interconnect their MPLS networks.

When services (e.g. QoS, IPv4/IPv6 address family, multicast, etc.) supporting networks of a primary SP and partner SP are not consistent, the potential services that can be offered to the MPLS VPN customer (end user) are limited to the lowest common denominator of the features supported between either network. This introduces limitations, for example, in terms of address family (IPv6/IPv4), multicast, QoS (Quality of Service) and SLA (Service Level Agreement) that cannot be consistently delivered end-to-end, topology controls (the partner network is seen as a 'black box' from the perspective of the primary SP (the one owning the customer account)), and operation complexity due to the need to involve the partner network in every provisioning request, which may also create security issues. In general, establishing global, end-to-end interconnectivity becomes very complicated due to both technical and business agreements between the primary SP and its numerous partner SPs that support its global VPN offering.

Conventional SP delivered MPLS VPN connectivity services suffer from several limitations that drive up the overall SP solution cost and complexity. These are in the areas of PE (Provider Edge) prefix scale limitations, PE-CE (Customer Edge) eBGP (external Border Gateway Protocol) session scale limitations, network reach due to label imposition/ deposition needs on network equipment, and flexibility and automation in the areas of policy push, endpoint mobility, and access diversity.

The embodiments described herein provide an IP Map and Encap (encapsulation) system running as an overlay that can be integrated within existing MPLS VPN infrastructure of the primary SP, to effectively extend its MPLS offering 'over the top' of any partner SP MPLS network, without any actions or interactions with partner SPs. In certain embodiments, the above limitations may be improved by using advanced SDN (Software-Defined Networking) and IP overlay technologies offered from a scalable Map and Encap overlay technology. As described below, complementary functions from both MPLS VPN and Map and Encap technologies may be used in certain embodiments to provide a new SP delivered VPN technology alternative that is competitive with new SDN trends, yet still maintains many advantages of MPLS VPN services (e.g., reliability, fast route convergence, and security).

As described in detail below, a system, referred to herein as an 'IP Map and Encap' or 'Map and Encap' system, operates to map and encapsulate traffic received at a primary SP VPN and provide an overlay for the traffic that traverses over (i.e., 'over the top') of a partner SP VPN thereby providing virtual end-to-end global connectivity without physically extending the primary SP infrastructure. In one example, the IP Map and Encap system may operate in accordance with LISP (Locator/Identifier Separation Protocol).

Referring now to the drawings, and first to FIG. 1, an example of a network in which embodiments described herein may be implemented is shown. For simplification, only a small number of nodes are shown. In the example shown in FIG. 1, a first (primary) network 10 is in communication with a second (partner) network 12. In one embodiment, network 10 is associated with a primary SP (Service Provider) and network 12 is associated with a different SP (e.g., local or regional SP). In the example shown in FIG. 1, networks 10 and 12 are MPLS (Multiprotocol Label Switching) VPNs (Virtual Private Networks). The partner MPLS VPN 12 may be, for example, a layer 3 (L3) network. In one example, an MPLS 'Option A' interconnect (as described in IETF RFC 4364, "BGP/MPLS IP Virtual Private Networks (VPNs)", E. Rosen et al., February 2006) is used between the two VPNs 10, 12.

The networks 10, 12 are in communication over an IP Map and Encap domain 14. As described below, the primary VPN 10 may be in communication with any number of partner VPNs 12 through the IP Map and Encap domain 14.

In one embodiment, the system includes a data plane comprising network devices moving bits between MPLS and the Map and Encap system (indicated by line 26 in FIG. 1), and a control plane (indicated by line 24 in FIG. 1) comprising the devices building and maintaining a relationship between a protocol (e.g., BGP (Border Gateway Protocol)) running the MPLS VPN and a Map and Encap mapping system 22. Examples of data plane and control plane connectivity are described below with respect to FIGS. 4 and 5, respectively.

Each network 10, 12 may include any number of edge devices or intermediate (core) nodes (e.g., routers, switches, access layer devices, aggregation layer devices, or other network devices), which facilitate passage of data within the network. In the example shown in FIG. 1, each VPN 10, 12 includes a plurality of edge devices. Provider edge (PE) devices 16 located in the first network 10 are in communication with customer edge (CE) devices 20. PE devices 18 in the first network 10 are in communication with PE devices 17 in the second network 12. PE devices 15 located in the second network 12 are in communication with CE devices 20. The edge devices may be routers, switches, or other network devices configured to perform forwarding functions (e.g., L2, L3, or L2/L3 devices).

In the example shown in FIG. 1, edge devices 18 in network 10 are in communication with IP Map and Encap mapping system 22, described further below. The mapping system 22 may be implemented on a gateway, server (e.g., mapping system server) or any other type of network device. A mapping server may, for example, provide the control plane with the mapping that allows the IP Map and Encap system to encapsulate customer traffic between locations. The mapping server may maintain, for example, customer prefixes known within the IP Map and Encap control plane. The mapping system 22 may comprise any number of physical or virtual devices located in one or more networks. Also, the mapping system 22 may include one or more databases stored on one or more network devices.

In one example, the edge devices 17, 18 are configured to perform ASBR (Autonomous System Boundary Router) functions. The edge devices 18 located in the MPLS VPN 10 may also be configured to perform proxy xTR (ingress tunnel router (ITR)/egress tunnel router (ETR)) functions. The CE devices 20 in the IP Map and Encap domain 14 may also be configured to perform xTR functions.

As shown in FIG. 1, ASBR devices 18 and CE devices 20 are located at the ends of Map and Encap tunnels 26, which allow the Map and Encap system to traverse over the partner network 12. This reduces the partner network 12 to a transport platform so that the partner network only needs to forward packets based on an outer (encap) IP header. Services provided by the primary SP VPN 10 are tunneled across (i.e., over the top of) the partner network 12, thereby eliminating the need to interface each service at the edge interconnecting the two networks. The tunnel 26 allows the primary SP VPN 10 to essentially extend to the CE 20, thus providing virtual end-to-end global connectivity without the need to physically extend the MPLS infrastructure of the primary SP.

It is to be understood that the network shown in FIG. 1 is only an example and the embodiments described herein may be implemented in networks comprising different network topologies or network devices, without departing from the scope of the embodiments. For example, MPLS VPNs are shown in the Figures and used in the examples described below, however, the embodiments may be implemented in other types of networks. Thus, it is to be understood that MPLS is provided only as an example in the embodiments described herein. Also, as described below, the primary VPN network 10 may be in communication with any number of partner networks 12.

Figure 2:
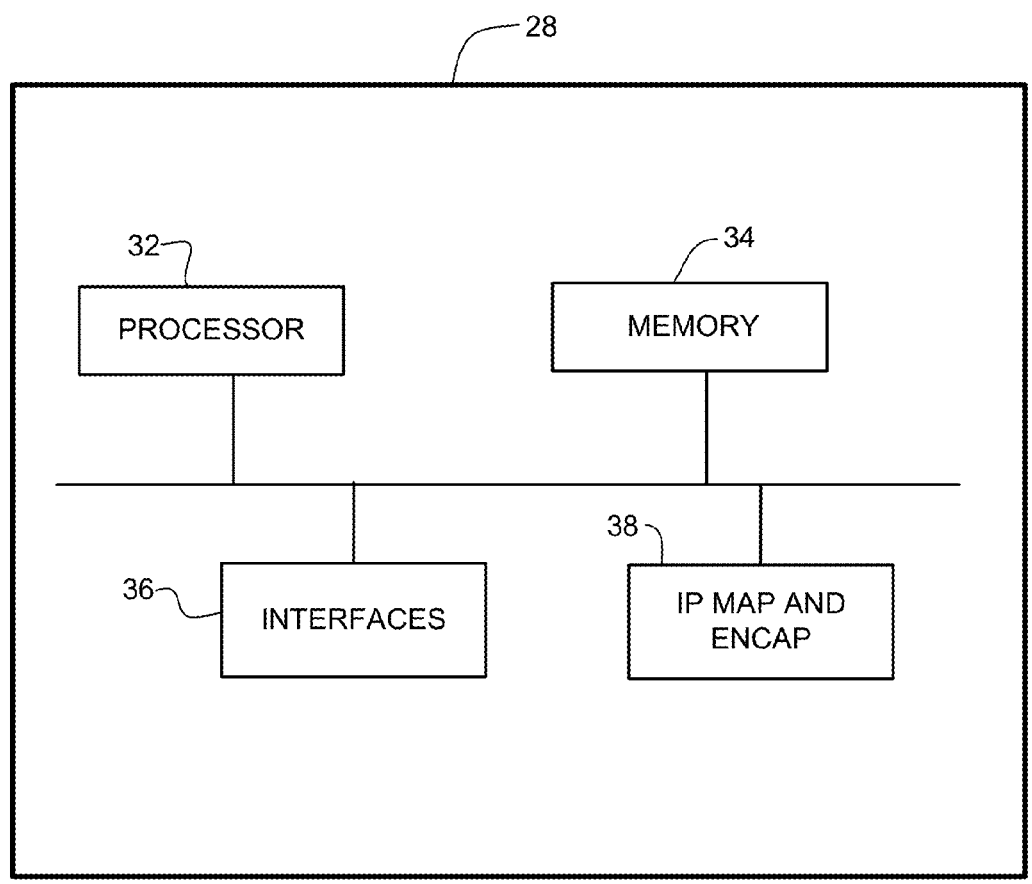
FIG. 2 depicts an example of a network device useful in implementing embodiments described herein.

FIG. 2 illustrates an example of a network device 28 that may be used to implement the embodiments described herein. In one embodiment, the network device is a programmable machine that may be implemented in hardware, software, or any combination thereof. The network device 28 includes one or more processor 32, memory 34, network interfaces 36, and IP Map and Encap components 38.

Memory 34 may be a volatile memory or non-volatile storage, which stores various applications, operating systems, modules, and data for execution and use by the processor 32. For example, IP Map and Encap components 38 (e.g., module, code, logic, database, etc.) may be stored in the memory 34. One or more IP Map and Encap components may be located at another network device (e.g., IP Map and Encap mapping system 22 in FIG. 1). The device 28 may include any number of memory components.

Logic may be encoded in one or more tangible media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 28 may include any number of processors 32.

The network interfaces 36 may comprise any number of interfaces (linecards, ports) for receiving data or transmitting data to other devices. The network interface may include, for example, an Ethernet interface for connection to a computer or network.

It is to be understood that the network device 28 shown in FIG. 2 and described above is only an example and that different configurations of network devices may be used. For example, the network device 28 may further include any suitable combination of hardware, software, algorithms, processors, devices, components, or elements operable to facilitate the capabilities described herein.

Figure 3:
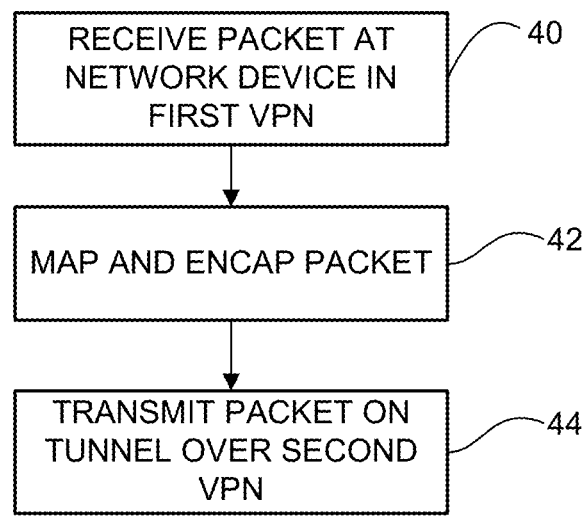
FIG. 3 is a flowchart illustrating a process for transmitting packets over interconnected virtual private networks, in accordance with one embodiment.

FIG. 3 is a flowchart illustrating an overview of a process for transmitting packets over interconnected virtual private networks, in accordance with one embodiment. At step 40, a packet is received at a first network device 18 located in a first virtual private network 10 (FIGS. 1 and 3). The packet is destined for a second network device 20 in communication with a second virtual private network 12. The packet is mapped and encapsulated by the IP Map and Encap system (step 42). As described below, the mapping and encapsulation may be performed at a gateway device, mapping system server, or other network device in communication with the first network device 18. The IP Map and Encap system provides an overlay that traverses over the second VPN 12. The packet is transmitted on tunnel 26 extending from the first network device 18 to the second network device 20 over the second VPN 12 (step 44).

It is to be understood that the process shown in FIG. 3 and described above is only an example and that steps may be added or modified without departing from the scope of the embodiments.

The following describes examples of embodiments that may be implemented in the network shown in FIG. 1. As noted above, the embodiments described herein may also be implemented in networks having different topologies, networks, configurations, or network devices.

Interconnecting VPNs with IP Map and Encap VPNs

In one or more embodiments data plane connectivity is enabled between customer sites operating within a traditional MPLS VPN and sites of the same customer that operate as an IP Map and Encap VPN (that is also traversing another MPLS network) within one or more partner MPLS networks. As described below in accordance with one embodiment, a gateway interconnectivity device performs data plane tasks. The data plane tasks may include, for example, encapsulation of traffic from an MPLS VPN to an IP Map and Encap VPN, or decapsulation of traffic from an IP Map and Encap VPN to an MPLS VPN.

In one example, a gateway device is responsible for receiving datagrams from any of the systems, and translating the appropriate datagram elements into a format that is appropriate for handling by another system. Enabling data plane interconnectivity via an IP Map and Encap architecture allows an SP not only to simplify partner interoperability relationships, but also establishes a foundation for enabling other enhancements and services that are available within an IP Map and Encap system, but not available with conventional interconnectivity mechanisms.

Figure 4:
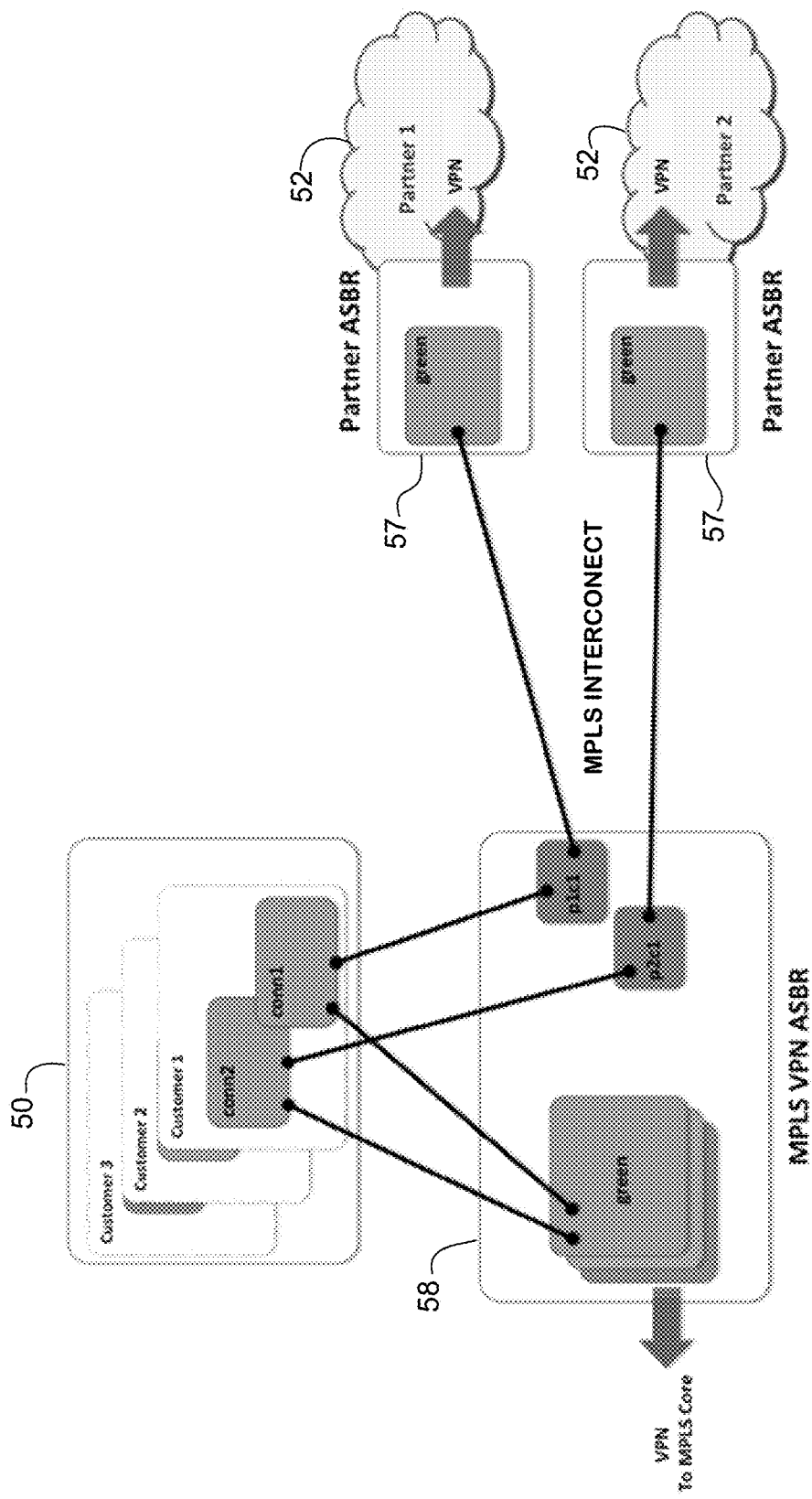
FIG. 4 illustrates an example of data plane connectivity, in accordance with one embodiment.

FIG. 4 illustrates an example of data plane connectivity for an IP Map and Encap-to-MPLS VPN gateway, in accordance with one embodiment. The primary SP uses a gateway device 50 to establish connectivity between the IP Map and Encap system and a native IP MPLS VPN system. In the example shown in FIG. 4, the primary SP is running an MPLS VPN network, and its partner networks also run MPLS VPN networks 52. Rather than using conventional interconnectivity mechanisms, the primary SP deploys an IP Map and Encap service as an overlay to the partner MPLS VPN network 52. In this example, a primary MPLS VPN edge device 58 is located in the MPLS VPN network (e.g., ASBR 18 in network 10 in FIG. 1) and in communication with the gateway device 50 and network devices 57 (e.g., ASBRs 17 in FIG. 1) located at the edge of partner networks 52 (partner 1 and partner 2). The network device 58 is also in communication with an MPLS core.

The gateway device 50 may be operable to handle traffic from any number of customers (e.g., customer 1, customer 2, customer 3), as illustrated in FIG. 4. Customer 1 is represented by a block labeled 'green' in FIG. 4. The customer may be segmented into any number of connections (conn1, conn2 in communication with p1c1 and p2c1, respectively, in FIG. 4).

The gateway 50 provides a number of data plane functions to allow these disparate systems to communicate. The gateway interconnectivity device 50 performs data plane tasks including, for example, encapsulation of traffic from MPLS VPN to IP Map and Encap VPN and decapsulation of traffic from IP Map and Encap VPN to MPLS VPN.

The following describes an example of actions performed for packets flowing from the MPLS VPN system to the IP Map and Encap system. When the native (unencapsulated) packet (which has a destination IP address of a partner CE) arrives at the gateway 50, the gateway encapsulates the packet and sends it towards its destination on the partner network 52. The outer header of this encapsulated packet is an IP packet (which is routable within the partner VPN 52). The inner header of this packet is the original header of the packet from the primary, native MPLS VPN.

The following describes actions performed for packets flowing from the IP Map and Encap system to the MPLS VPN system. Packets sourced from a partner-connected CE are encapsulated and sent to the gateway 50. When the encapsulated packet (which has an outer header destination of the gateway 50) arrives at the gateway, the gateway strips off the outer header, leaving the original, native packet, which the gateway forwards (natively) to the appropriate MPLS VPN VRF (Virtual Routing and Forwarding).

The above described behavior preserves the segmentation between customer traffic by providing a 1:1 mapping between partner VRFs and native MPLS VPN VRFs.

Reducing Number of VRFs

One or more embodiments enable an SP to run an IP Map and Encap system as an overlay to an MPLS VPN network to allow customers to run multiple VRFs for internal, departmental segmentation, but only need the SP to run a single customer VRF with the core MPLS VPN network.

Enabling an SP to run an IP Map and Encap system as an overlay to an MPLS VPN network to allow customers to run multiple VRFs for internal, departmental segmentation, reduces the number of customer VRFs needed within the core MPLS VPN network to a single MPLS VRF per customer.

This significantly improves scaling limitations within the core MPLS VPN network, thereby allowing the SP to more efficiently operate the network.

In one embodiment, virtualization is enabled within customer address space in the IP Map and Encap system. By virtualizing the customer address space in this way, an SP running an IP Map and Encap system as an overlay to an MPLS VPN only needs to run a single VRF for each customer VPN, thus minimizing the total number of VRFs needed with the MPLS network.

In one example, an SP runs the MPLS VPN network 10 and an IP Map and Encap system as an overlay to another MPLS VPN network 12 (FIG. 1). The SP may, for example, deploy mapping server 22 that maintains customer prefix segmentation within the IP Map and Encap control plane 24. The SP may also deploy a single VRF per VPN customer within the MPLS VPN network serving as locator space segmentation for the 'encap' side of the IP Map and Encap data plane. The map server 22 provides control plane segmentation, which permits overlapping IP addresses within customer VPNs. The IP Map and Encap data plane devices utilize the control plane information within packet headers built during the encapsulation process to segment traffic across the single customer VRF within the SP MPLS VPN network 10.

Parallel Segmentation and VPNs

One or more embodiments enable parallel IP Map and Encap system locator space virtualization. Parallel segmentation allows for a single map server and gateway to be shared to interconnect multiple partners. Enabling gateway device and mapping service device parallel segmentation confine partner network infrastructure addressing to isolated containers, thereby allowing one device to be shared to support multiple partner network interconnections.

In one example, the primary SP runs MPLS VPN network 10 and its partner network also runs an MPLS VPN network 12. The primary SP deploys and operates a gateway device 50 that utilizes parallel network segmentation to connect into the customer MPLS VPN locator space within one or more partner MPLS VPNs (FIGS. 1 and 4). The primary SP may also deploy an IP Map and Encap service on customer CE devices 20 running in the partner MPLS VPN network 12. In another example, the primary SP may deploy a mapping service device 22 that utilizes parallel network segmentation to allow registration of customer CE devices running the IP Map and Encap service within one or more partner MPLS VPNs The gateway device parallel segmentation allows the primary SP to restrict partner infrastructure addresses from leaving into its own customer MPLS VPN routing table and yet still provides data plane services across multiple partner SP MPLS VPN networks with no change of architecture, configuration, or operation, regardless of partner SP MPLS VPN capabilities. The mapping service device parallel segmentation allows the primary SP to provide control plane services across multiple partner SP MPLS VPN networks to support these data plane services.

Consistent Data Plane Services with Encapsulation

One or more embodiments enable consistent IP data plane services across diverse VPN environments while also allowing for optimal routing via the IP Map and Encap system. In today's telecommunications environment, it is not uncommon for an enterprise customer to contract with a primary service provider for global VPN services. Yet, many of these primary SPs do not have a global network footprint and thus require partner arrangements with local secondary SPs. When these two VPN domains interconnect, it is not uncommon that there is a service inconsistency (i.e., mismatched QoS, multicast capabilities or IPv4/IPv6 services). If a CPE (customer provider edge) device is enabled with an IP Map and Encap system, which provides stateless tunnels that traverse the secondary SP's basic IP VPN service and there is an appropriate gateway device between the SP domains, then service parity with the primary SP can be maintained while only needing the most basic IP VPN transport from the secondary SP.

In conventional networks, when two SPs interconnect, there usually is a mismatch in data plane service models, which results in the inability to provide that service to the end customer. In one example, a primary SP runs an MPLS VPN service that provides private IP transport for IPv4 services for a contracted enterprise customer, but optionally the customer can purchase advanced services such as IPv6 transport, multicast services, or QoS services from this primary SP's MPLS VPN. All these additional services have specific configuration options and characteristics that are set by the primary SP and are part of the end-to-end contracted service definition that the enterprise customer purchased. The primary SP has invested capital and operation expenditures in supporting these advanced services and has enabled its network footprint to support these capabilities. However, if the primary SP contracts with a secondary MPLS VPN service provider in order to extend the network reach to a specific set of customer sites that are not within the primary SPs covered geography, it is highly likely that these optional data plane services will be mismatched and configured differently by the secondary SP or unavailable altogether. This means different end-to-end network characteristics from the expected primary SPs service definition.

For example, for QoS services the primary SP expects arriving IP packets to be already classified a certain way via the DSCP (Differentiated Services Code Point) bits in the IP header so that it can provide proper QoS treatment as configured in the network. This classification (or marking) is defined by the primary SP and it is expected that the end customer adheres to this published definition. However, the secondary SP, which hosts the customer site connection, may have defined a different QoS DSCP classification model. Similar inconsistencies can exist for IPv6 and multicast services. Thus, when two SPs interconnect, there usually is a mismatch in service models which would result in the inability to provide that service to the end customer as expected. For example, if the primary SP supports multicast and the secondary SP does not, then there is no end-to-end multicast. Also, if the primary SP supports IPv6 and the secondary SP does not, then there is no end-to-end IPv6 transport. If the primary SP supports QoS with "X" classes of service and the secondary SP only supports a limited set of "X-3" classes of service, then there is only the limited "X-3" classes of service end-to-end.

The embodiments described herein enable a primary SP to run an IP Map and Encap system as an overlay to a secondary SPs MPLS VPN network, which allows enhanced services consistency between customer sites while providing optimal any-to-any routing and enhanced security. By only needing the secondary SP to support a basic IPv4 MPLS VPN service, the primary SP can use the IP Map and Encap system to provide enhanced services data plane feature consistency. The primary SP may deploy a CPE at the customer site (which has configuration policies specified by the primary SP) that is performing the IP Map and Encap function. The stateless IP tunnels 26 enabled by this system carry within it the original customer data plane traffic where this traffic supports all the optional services as defined by the primary SP (FIG. 1). Additionally, due to the nature of the IP Map and Encap system providing any-to-any optimal routing via a scalable mapping server model, these optional advanced services can also be extended in a very scalable way between two different sites on the same secondary SPs network (i.e., traffic does not traverse the primary SP network).

The IP Map and Encap system uses map server 22 to provide the control plane 24 with the mapping that allows the IP Map and Encap service to IPv4 encapsulate customer traffic between locations, where the IPv4 location identifiers may be the only routes carried in the secondary SP's MPLS VPN network (FIG. 1). Stateless IP tunnels 26 are enabled by this system that carries within it the original customer data plane traffic packets, where this traffic supports all of the optional services as defined by the primary SP.

For example, if the customer needs IPv6 or multicast services (or any non-basic IPv4 unicast service), these types of packets are encapsulated by the CPE in unicast IPv4 and tunneled over the secondary SPs basic IPv4 network to the primary SP's IP map and encap gateway device 50, which would terminate the IPv4 tunnel and put the customer's native traffic into the primary SP's MPLS VPN network 10, which is enabled for native IPv6 or multicast VPN services (FIGS. 1 and 4). Additionally, due to the nature of the map and encap system providing any-to-any optimal routing via a scalable mapping server model, these optional advanced services can also be extended in a very scalable way between two different sites on the same secondary SPs network (i.e., traffic does not have to traverses the primary SP's network). This is considered an advantage over traditional static based tunneling models.

For QoS services, the customer data plane traffic may be DSCP classified at the CPE using the primary service provider's policies, and then encapsulated by the CPE's IP Map and Encap system into an IPv4 unicast tunnel and sent over the secondary SPs network. When the packet arrives at the primary SP's IP Map and Encap gateway device 50, the tunnel encapsulation is terminated and the customer data plane packet is exposed (which has the proper primary SP DSCP markings), and is then provided the same QoS functionality as other traffic native to the MPLS VPN network.

Lastly, by allowing the data plane encapsulation protocol to support a virtualization identification field (set by the primary SP's policy definition on the CPE and not by the secondary SP), the primary service provider can ensure proper VPN bindings between the two service provider domains, thereby enhancing the overall security of the solution.

Interconnecting IP Map and Encap System with VPN Via Mapping System

One or more embodiments enable control plane connectivity between customer sites operating within a traditional MPLS VPN and sites of the same customer that operate as an IP Map and Encap overlay VPN (which is also traversing another MPLS network) within one or more partner MPLS networks.

In one embodiment, a device, referred to herein as a mapping system server, is responsible for marrying the contents of the MPLS VPN's BGP control plane with the IP Map and Encap system's control plane. The mapping system server cross publishes the two system's information to ensure bi-directional data plane reachability. The mapping system server device provides for the interconnection of routing system information to enable data plane reachability between any of the systems.

Enabling control plane interconnectivity via an IP Map and Encap architecture allows an SP not only to simplify partner interoperability relationships, but also establish a foundation for enabling other enhancements and services that are available within an IP Map and Encap system, but not available with traditional interconnectivity mechanisms.

Figure 5:
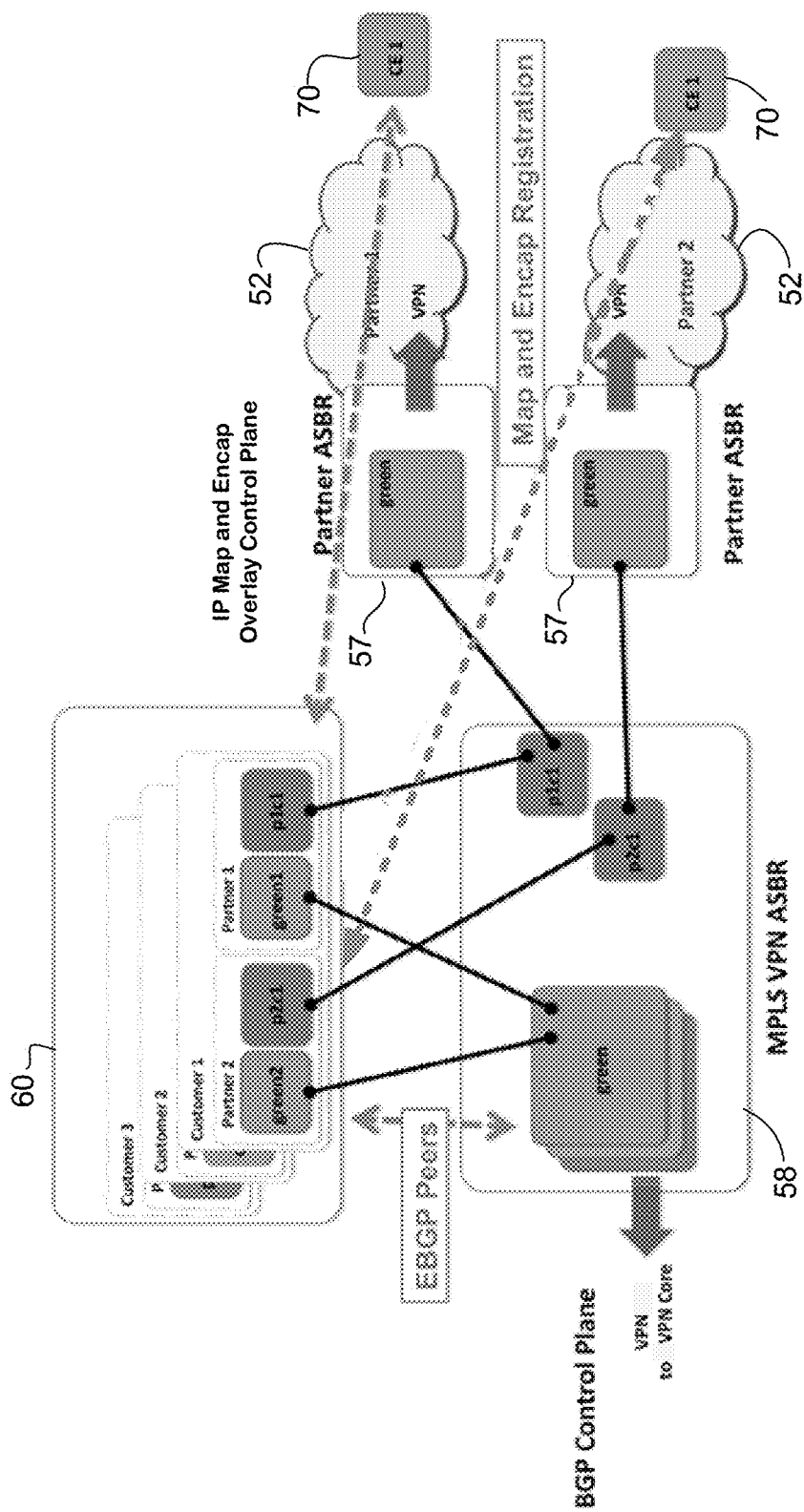
FIG. 5 illustrates an example of control plane connectivity, in accordance with one embodiment.

FIG. 5 illustrates an example of control plane connectivity for an IP Map and Encap-to-MPLS VPN gateway. As described above, the IP Map and Encap overlay control plane extends from the mapping system to CE devices 70. FIG. 5 shows how the primary SP uses a mapping system server (MSS) 60 to establish reachability for both BGP information from the traditional MPLS VPN network, and the IP Map and Encap information from the overlay network, in accordance with one embodiment. As shown in FIG. 5, the edge device 58 (in the primary network 10 of FIG. 1) and the MSS 60 are eBGP (External Border Gateway Protocol) peers. Map and Encap registration is performed over the control plane.

The MSS 60 provides, but is not limited to, the following example control plane functions to allow the disparate systems to communicate. The MSS 60 may import BGP routes describing the reachability of MPLS VPN sites into an MSS database. Also, the device may export from the MSS database the IP Map and Encap site prefixes into the MPLS VPN's BGP control plane.

The above described behavior preserves control plane consistency across all networks, ensuring paths and reachability for the data plane packets.

Map and Encap Overlay for Improved Scale, Flexibility, and Reach of MPLS VPN Services Certain embodiments use complementary functions from both MPLS VPN and Map and Encap (e.g., LISP) technology to provide a new SP (Service Provider) delivered VPN technology that provides an SP-class architecture that may allow for more scale and reduced costs, while providing flexibility for new SDN (Software-Defined Networking) services.

As described in detail below, an IP overlay based Map and Encap system is used to abstract endpoint addressing and logical VPN grouping, thereby offloading these functions (e.g., alleviating prefix, VRF, and BGP session scale) from the MPLS VPN PEs. By using benefits obtained from MPLS VPN BGP underlay technology for providing high reliability, security, and fast locator address reachability detection, the IP Map and Encap overlay system becomes more robust and reactive to failures. In certain embodiments, a policy API (Application Programming Interface) is provided in a Map and Encap server so that application programmers can have access to per-flow routing, endpoint mobility control, and advanced load balancing functions at the overlay level, without disturbing the stable underlay. Certain embodiments scale to meet customer demands in the areas of prefix scale, VRF scale, fast convergence, extended reach, endpoint address opaqueness, and SDN-like policy control, while lowering overall equipment costs by allowing more customer logical scale to be served by the provider edge device by offloading functionality to the mapping system.

Figure 6:
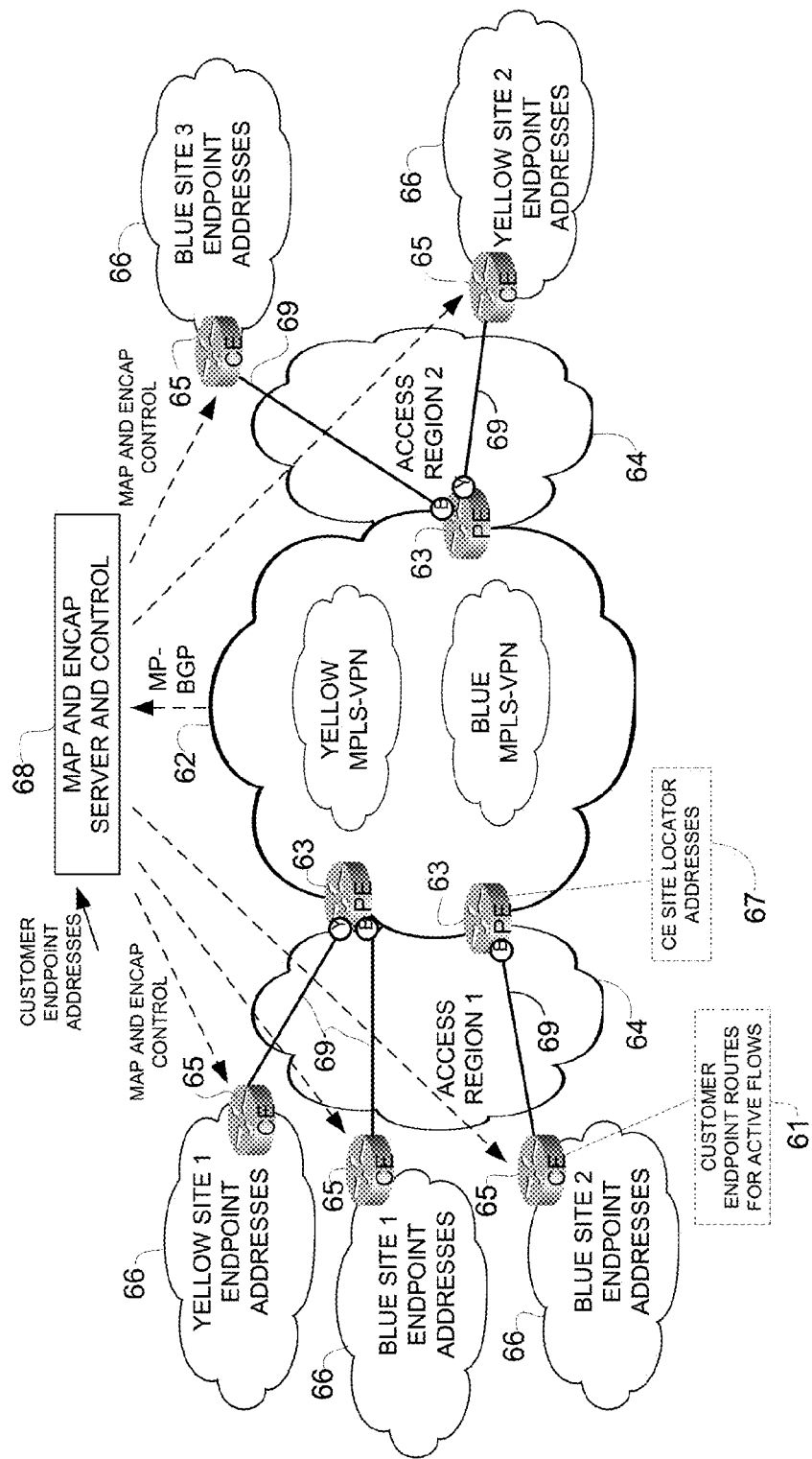
FIG. 6 illustrates an example of a network comprising a Map and Encap overlay initiated on customer edge devices, in accordance with one embodiment.
Figure 7:
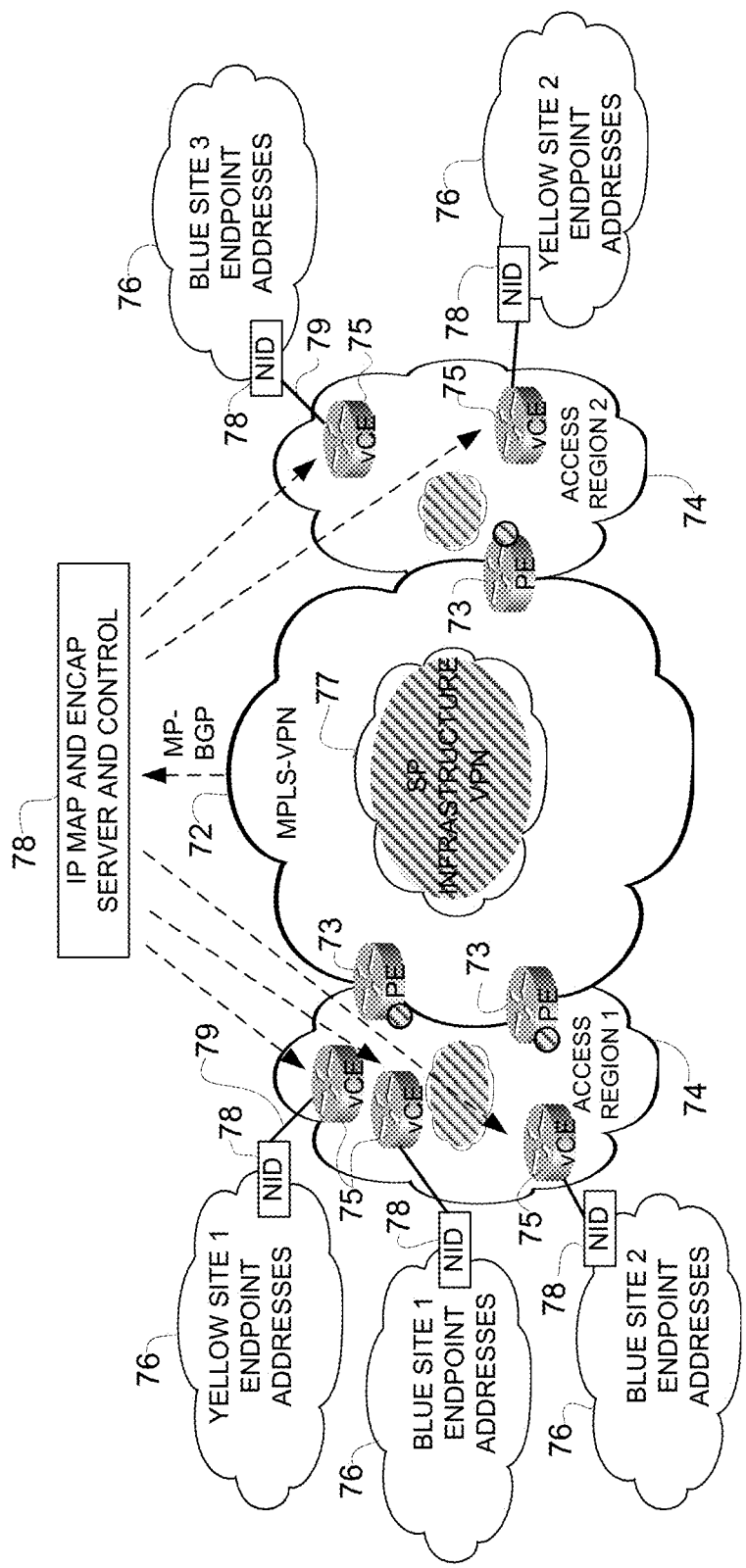
FIG. 7 illustrates an example of a network comprising a Map and Encap overlay initiated on virtual customer edge devices, in accordance with one embodiment.

Referring now to the drawings and first to FIGS. 6 and 7, networks in which certain embodiments may be implemented are shown. FIGS. 6 and 7 illustrate two examples of deployment models for SP provided VPN technology described herein.

FIG. 6 illustrates an SP VPN via IP Map and Encap (e.g., LISP) overlay initiated from customer premises CE devices 65 over MPLS VPN network 62. The MPLS VPN network 62 includes a plurality of provider edge (PE) devices 63. The PE devices 63 are in communication with CE devices 65 at customer sites 66. In the example shown in FIG. 6, there are multiple customer sites (yellow sites 1 and 2, blue sites 1, 2, and 3). The CE devices 65 are in communication with IP Map and Encap server 68 (central mapping system) via a control plane (e.g., LISP control). Only PE-CE link prefixes are in MPLS VPN VRF tables (e.g., used as LISP routing locators (RLOCs)) and advertised in MP-BGP across MPLS VPN 62. The SP uses diverse VRFs per enterprise, with multiple MPLS VPNs on an MPLS PE. Each VRF is used only for the locator space for the IP Map and Encap enabled CE devices 65 deployed at the premises 66. In one embodiment, a point-to-point PE-CE link 69 (e.g., over an L1/L2 access network 64 (access region 1, access region 2)) is used to connect the MPLS PE 63 to the LISP CE 65.

FIG. 7 illustrates a deployment model in which an IP Map and Encap overlay is initiated on virtual CE devices 75 located in SP access networks 74. In the example shown in FIG. 7, the SP uses a single MPLS VPN 77 for all enterprises (single VRF) with IP Map and Encap (e.g., LISP) enabled virtual CEs (vCEs) 75. The SP infrastructure VPN 77 is not customer specific. The vCEs 75 are provisioned on server technology deployed in the SP PoP access network 74. A low cost layer 2 switch or NID (Network Interface Device) 78 may then be used at the premises (customer sites) 76. In one embodiment, only vCE link 79 prefixes are in common infrastructure MPLS VPN VRF tables (e.g., used as LISP RLOCs) and advertised in MP-BGP across MPLS VPN 72.

Figure 8:
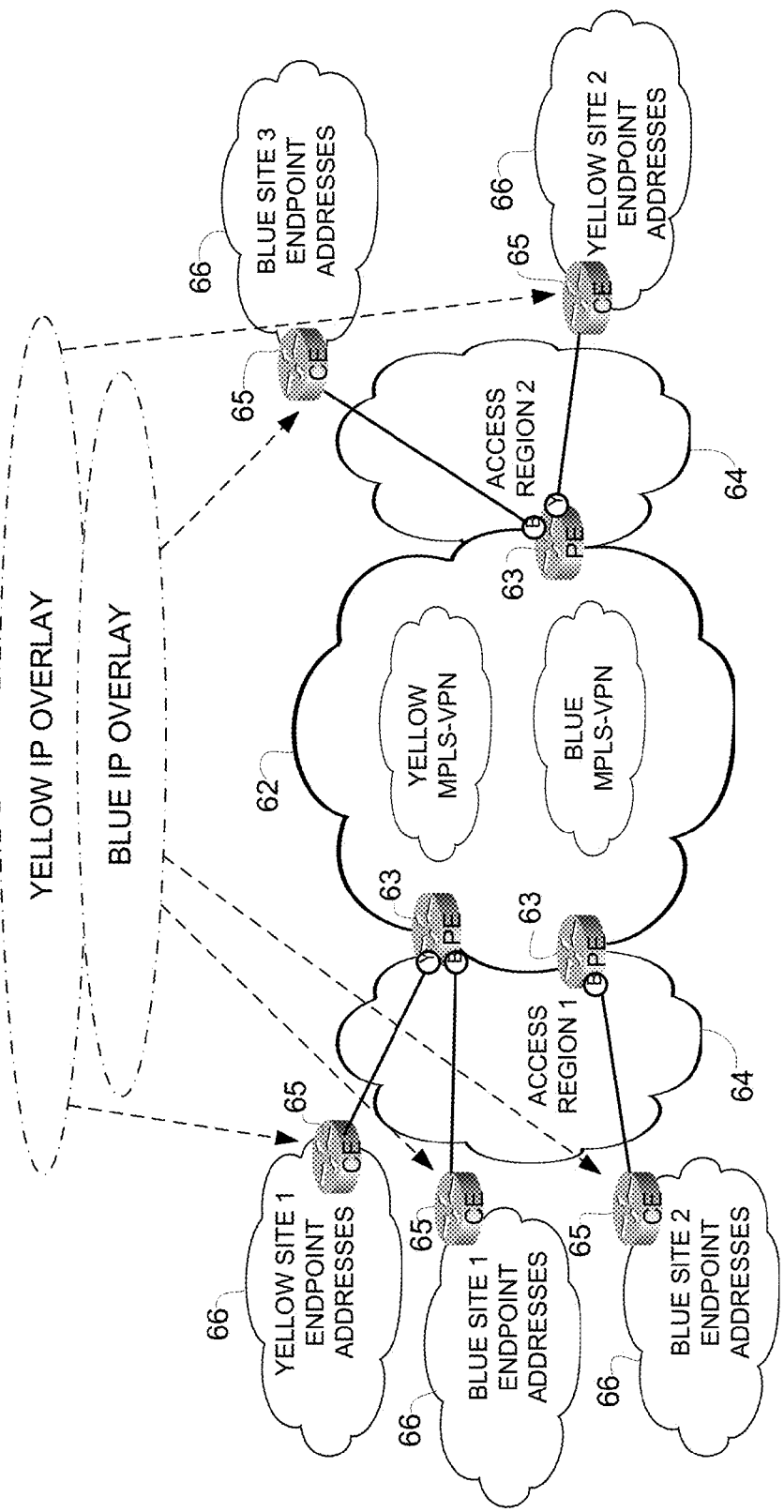
FIG. 8 illustrates an example of a Map and Encap overlay data plane in the network of FIG. 6, in accordance with one embodiment.

FIG. 8 illustrates an example of an IP Map and Encap data plane in the network of FIG. 6, in accordance with one embodiment. As shown in FIG. 8, the IP Map and Encap (e.g., LISP) overlay is 'over the top' of the underlying MPLS VPN 62. This is illustrated as a sample of the data plane across the MPLS VPN core network 62.

In certain embodiments, the IP Map and Encap CE devices 65, 75 use a central mapping system 68, 78 as its control plane. The mapping system 68, 78 is where customer endpoint addresses are registered to, stored, mapped, and maintained. This includes any logical identifier used to determine LISP VPN membership, for example. The IP Map and Encap system may support various address formats, including for example, IPv4, IPv6, MAC, and RFID tags. These customer endpoint addresses register their reachability address (e.g., IPv4 or IPv6 locator) to the mapping system 68, 78. These reachability addresses are relevant to the MPLS VPN underlay and are considered infrastructure routes. They may be, for example, /30, /31, or /32 prefixes of the PE-CE links 69, 79 connecting the MPLS PE devices 63, 73 to the IP Map and Encap CE devices 65, 75. In certain embodiments, they are not summarized into MP-BGP but kept as specific routes.

The term 'provider network' as used herein may refer to any core or primary/secondary network. The term 'customer network' as used herein may refer to any premise, site, enterprise, or other network including a virtual private network.

It is to be understood that the networks shown in FIGS. 6, 7, and 8 are only examples and that the embodiments described herein may be implemented in other networks comprising different network devices or network topologies, without departing from the scope of the embodiments.

The following describes examples of embodiments that may be implemented in the networks shown in FIGS. 6 and 7 and advantages provided by these embodiments.

Reducing Number of Routes in a VPN

Certain embodiments enable an SP to run an IP Map and Encap system as an overlay to an MPLS VPN network to allow customer routes to be handled by the control plane of the IP Map and Encap system. Only customer end site locator addresses are needed within the core MPLS network VRF for each customer VPN, thereby minimizing the total number of routes carried within the core MPLS network.

In the example shown in FIG. 6, the MPLS VPN PE network 62 only carries CE site locator addresses 67 (PE-CE links 69) within the MPLS PE network VRFs for each customer, and not the customer endpoint addresses. In addition to the customer routes not being maintained in the PE devices 63, the mapping system 68 may use a dynamic cache based resolution model, which eliminates the need for the IP Map and Encap CE devices 65 to maintain all of the customer endpoint routes, thereby minimizing scale in both the PE devices 63 and CE devices 65. In certain embodiments, only active flow routes 61 are maintained on the CE devices 65 after being resolved by the mapping system 68. Specific destination routes may be pre-populated in the CE devices 65 before a flow is initiated in order to reduce the initial flow set-up resolution delay. This allows, for example, a one thousand site network to have only one thousand locator addresses in the respective MPLS VPN VRF table. The customer endpoint addresses may be IPv4, IPv6, MAC, RFID, or any other future addressing scheme without changing the foundational resolution solution or making changes to the underlying MPLS VPN.

The SP may, for example, deploy a mapping server 68 that maintains customer prefixes known within the IP Map and Encap control plane or deploy a VRF per VPN customer within the MPLS VPN network that carries only infrastructure routes for customer end site locations, which are used for the 'encap' side of the IP Map and Encap data plane. The mapping server 68 provides the control plane with the mapping that allows the IP Map and Encap service to encapsulate customer traffic between locations, where the locations only need to be carried in the customer VRF of the MPLS VPN network.

Enabling an SP to run an IP Map and Encap system as an overlay to an MPLS VPN network to allow customer routes to be handled by the control plane of an IP Map and Encap system minimizes the total number of routes carried within the core MPLS network. As previously described, only customer end site locator addresses are needed within the core MPLS network VRF for each customer VPN, for certain embodiments. This is advantageous in that there are far fewer infrastructure routes for customer end site locations than there are customer routes, and infrastructure routes for customer end site locations are very stable and as a result cause little to no churn in the SP routing system structure. Both of these aspects significantly improve the scaling limitations within the core MPLS VPN network, thus allowing the SP to more efficiently operate the network.

VRF Reduction

Certain embodiments provide VRF reduction in the MPLS PE devices. In conventional implementations, there may be a VRF per enterprise customer, and in some cases, multiple VRFs per enterprise customer (e.g., in the case of an enterprise needing departmental separation). VRFs take up resources on the PE devices 63 and have a logical limit. By utilizing the overlay and the instance identifier field (IID) in the LISP protocol, for example, multiple LISP VPNs can be multiplexed over the same MPLS VPN VRF (over the same underlay container). This would be the case in the implementation shown in FIG. 6, when a single enterprise has multiple departments to remain separate or in FIG. 7, when multiple vCEs 75 ride over the same infrastructure MPLS VPN underlay.

Speeding Convergence Using Explicit Routes

As previously described, certain embodiments enable an SP to run an IP Map and Encap system as an overlay to an MPLS VPN network to allow customer routes to be handled by the control plane of an IP Map and Encap system and to only need customer end site locator addresses within the core MPLS network VRF for each customer VPN. This provides very stable and highly reliable and accurate 'liveness' (availability) information for customer end site locations, as used by the encap aspects of the IP Map and Encap data plane. These aspects significantly improve the scaling limitations within the core MPLS VPN network, thus allowing the SP to more efficiently operate the network.

As described above, the map server 68 provides the control plane with the mapping that allows the IP Map and Encap service to encapsulate customer traffic between locations, where the locations only need to be carried in the customer VRF of the MPLS VPN network. In certain embodiments, the SP core MPLS VPN network carries only the infrastructure routes for customer end site locations with the BGP control plane for the core MPLS VPN network. These prefixes are very stable and as a result cause little to no churn in the SP routing system structure. This is useful in terms of reachability information for the encap aspects of the IP Map and Encap data plane.

In one embodiment, speeding convergence is provided using explicit BGP routes. The fast route failure detection mechanism of BGP may be used for the redistributed PE-CE link prefixes in the MPLS VPN VRFs, for example, so that locator address health and reachability can be quickly determined. By not aggregating the PE-CE link addresses in the MPLS VPN, a locator failure is quickly learned and propagated via MP-BGP. This can then alert the mapping system 68, 78, which is a BGP listener, to remove the endpoint addresses as the underlay locator has changed. This embodiment provides an improvement over using only an overlay control plane, which would result in a need for the mapping system to continually send keepalive messages to the CE LISP elements. For potential 'silent' CE failures (e.g., where the access network cannot be detected by the PE), the PE can also run BFD (Bidirectional Forwarding Detection) between PE and CE devices. BFD is a lighter weight protocol then BGP and has the benefit of being run in line card CPU process space as opposed to route processor CPU process space.

BGP Session Scale Reduction

In conventional networks, a BGP session is used for the PE device to learn the customer routes and place them into the appropriate MPLS VPN. Use of a centralized map server 68, 78 in certain embodiments, eliminates the need for this learning. Thus, in certain embodiments, there is no need for eBGP sessions on the PE devices 63, 73. This increases the available control plane resources. The locally attached PE-CE subnets may still be redistributed into MP-BGP to be used as locator addresses in the VRF.

Extending Network Reach Over Non-MPLS Capable Access Networks

In certain embodiments, the PE-CE link 69, 79 may be abstracted to any IP access network (and not confined to a single L1/L2 point-to-point link network). Thus, as SPs build out IP access networks for Wireless Broadband, Wireless Mobility, Data Center, or Metro-Ethernet, the IP overlay technology can be used ubiquitously across these networks and then over the MPLS VPN. The MPLS VPN technology provides a good way for these access technologies to then connect to each other.

Endpoint Mobility

Certain embodiments provide a more scalable and robust endpoint mobility and policy solution. With conventional MPLS VPN, in order to get endpoint mobility, the endpoint address needs to be propagated into the VRF, which would cause a large increase in scale. Also, any endpoint movement would churn the underlying MP-BGP routing table, increasing control plane scale as updates are pushed to all PE devices regardless of active session flow presence. With certain embodiments described herein, the endpoint changes are not carried into the underlay. Any changes are invisible to the MPLS VPN, thereby allowing PE control plane and prefix memory resources to be used for other things (e.g., adding more customers). Also, policy information such as 'best entrance' load balancing can be done at the mapping system controller level (e.g., on specific flows) without disturbing the underlay routing. By leveraging a well-defined policy API to the mapping system, new possibilities are opened up as to how an application driven LISP (or SDN) control plane can be used in combination with a highly reliable stable secure and robust MPLS VPN underlay Multi-Home to Multiple Partner VPNs Certain embodiments enable a service provider (SP) based virtual private network multi-homing solution, where a site has its access connections provided by secondary (or partner) SPs, yet the primary (or contracted) SP is able to provide consistent services to these sites via an overlay Map and Encap system. In one embodiment, a site has at least two access connections, with each provided by different secondary SPs. An IP Map and Encap system, administered by a primary SP, is used over the diversely routed IP networks to provide consistent services and routing with the primary SP's other MPLS VPN sites.

Customers needing diverse access over multiple carrier networks are best served in an environment where there are heterogeneous access networks with multiple service providers. However, complex coordination and service mismatches make this a challenging architecture. In today's telecommunications environment, it is not uncommon for an enterprise customer to contract with a primary service provider (SP) for global VPN services. However, many of these primary SPs do not have a global network footprint and thus require partner arrangements with in-country secondary SPs. Additionally, these sites usually need multi-homed access for increased resiliency using diverse access networks (multiple partner SPs). By having an IPv4 Map and Encap system approach for multiple connections, only basic IPv4 transport is needed from the partner providers, yet full routing resiliency and connectivity is maintained with advanced feature parity (multicast, IPv6, QoS markings) due to the overlay encapsulation.

The following describes an example of how a Map and Encap system can be used to inter-work with traditional MPLS VPN services to provide an enhanced resiliency solution. Scalable optimal routing is also enabled by allowing for sites on the same partner network to communicate directly due to the nature of the stateless tunneling mechanism and mapping system. This is unique to using a Map and Encap system versus traditional static tunneling mechanism.

In one embodiment, a site has at least two access connections, with each provided by different secondary SPs. Since the partner networks are routed disjointed and are not reachable directly from each other, separate overlay networks may be used with separate Map and Encap systems. The primary service provider may normalize the connections into its MPLS VPN network for any partner-to-partner site connectivity. An IP Map and Encap system (or systems), administered by a primary SP, is used over the diversely routed IP networks to provide consistent services and routing with the primary SP's other MPLS VPN sites and between sites on diverse partners. By having diverse access connections (across multiple provider networks) for a customer site, overall resiliency and redundancy is enhanced. The IP Map and Encap system is used for feature consistency with the primary provider's MPLS VPN network, without incurring additional requirements for the underlying partner SP routed IPv4 networks.

Figure 9:
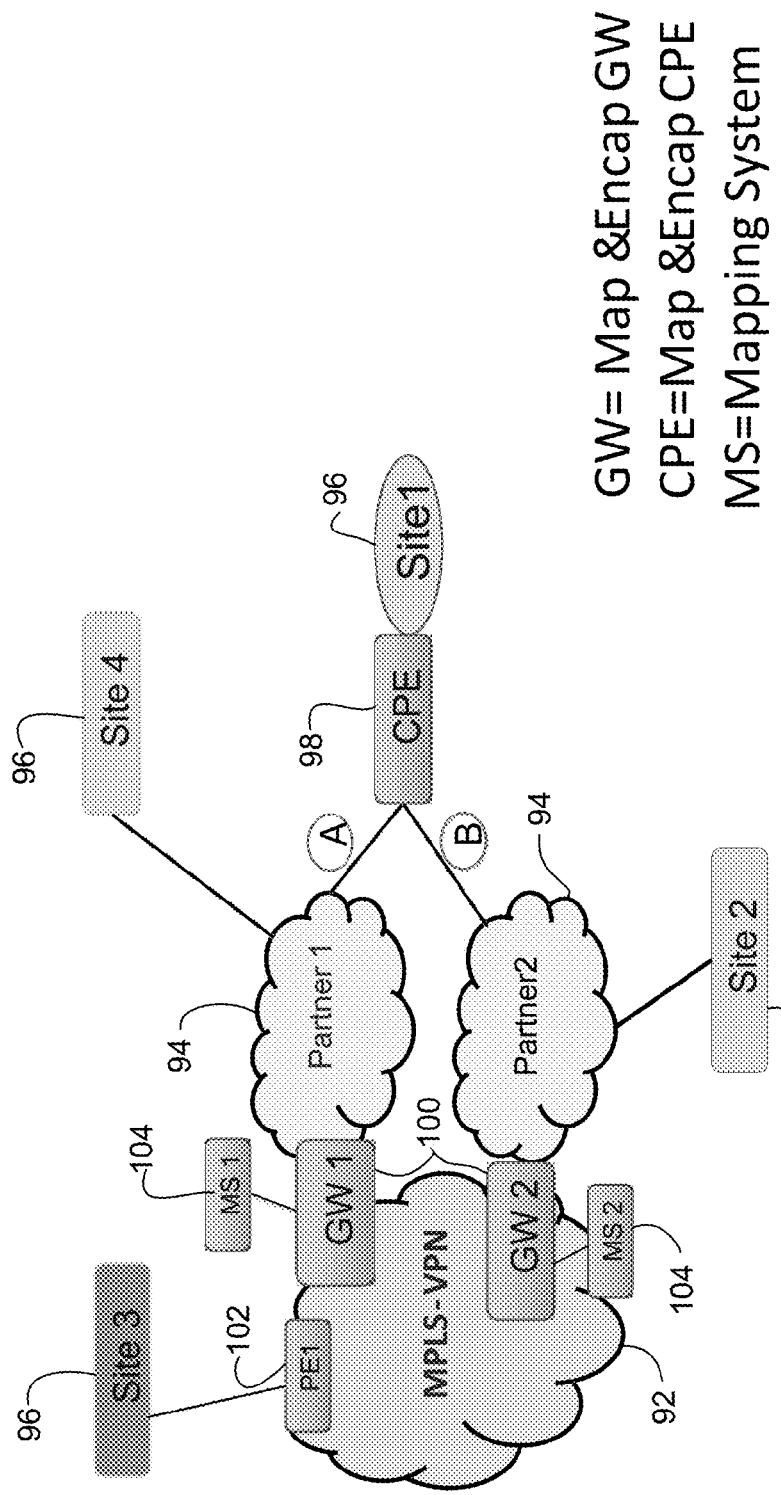
FIG. 9 illustrates an example of a dual-home connection at a customer site, in accordance with one embodiment.

FIG. 9 is an example illustrating a dual-homed CPE device 98 at end customer site 96. The MPLS VPN network 92 includes two gateways 100 (GW 1, GW 2) and a provider edge device (PE1) 102. The gateways (GW 1, GW 2) 100 are in communication with partner networks 94 (partner 1, partner 2), which are in communication with site 1 via CPE 98 through connections A and B. Partner networks 1 and 2 are also in communication with site 4 and site 2, respectively. PE1 is in communication with customer site 3.

A primary SP runs MPLS VPN network 92 and also runs a unique IP Map and Encap system as an overlay with each secondary SP network 94 (e.g., two or more secondary SP networks). If an enterprise customer that has contracted for VPN services from the primary SP requires a multi-homed site for high availability purposes with diverse access connections in a geography where there is no physical connectivity to the primary SP, the primary SP can contract with a partner SP (partner 1) to provide a private IPv4 service (or other service) with a connection between partner 1's SP network 94 and the customer's CPE 98, and contract with a second partner SP (partner 2) to provide a private IPv4 service with a second connection between partner 2's SP network 94 and the customer's CPE 98. If the CPE device 98 is enabled to operate as an IP Map and Encap system (with centrally controlled mapping systems by the primary SP), stateless tunnels traverse each secondary SP's basic IP VPN services, thus minimizing inter-working issues and providing the overall proper VPN connectivity. Appropriate Map and Encap gateway devices 100 are placed between the primary and partner SP domains to terminate the overlay connections into the primary SP's MPLS VPN 92. Service parity with the primary SP can be maintained while only using basic IP VPN transport from the secondary SPs. For example, the partner SPs only need to provide basic IPv4 routed services (via any standard means including MPLS VPNs). The primary SP can use the scalable Map and Encap system over the partner connections to minimize complex partner network routing and service requirements.

In the example shown in FIG. 9, the primary SP has deployed a Map and Encap gateway 100 between itself and partner 1 (GW 1) and another Map and Encap gateway between itself and partner 2 (GW 2). The primary SP may also deploy a mapping database system 104 per partner SP (MS 1 and MS 2). The primary SP may use a stateless and scalable overlay encapsulation architecture over the partner's networks 94 to bind users to the appropriate MPLS VPN VRFs inside the primary SPs network 92.

In one example, the CPE 98 at the customer site 96 has two WAN connections; connection A to partner SP 1, where the partner SP is providing some type of basic private IPv4 routing service (e.g., MPLS VPN or other) and connection B to partner SP 2, where the secondary SP is providing some type of basic private IPv4 routing service (e.g., MPLS VPN or other).

The CPE 98 has, for example, eBGP sessions with each partner SP's PE over each of their respective connections (connection A and connection B) and learns just the locator information of any of the same customer sites also connected to the same partner SP. IPv4 locator reachability information is also learned for the respective mapping system 104 and the deployed Map and Encap gateways 100 between the primary SP 92 and the partner SPs 94. The CPE 98 runs its Map and Encap function over the connection A and B interfaces. The CPE 98 registers its endpoint prefixes with the appropriate network locators for each mapping system 104.

In one example, the system functionally operates as follows during non-failure conditions. Traffic leaving the customer CPE site 96 destined to a site on partner 1 SP network 94 will not have a specific route and thus will activate a Map and Encap process, which queries both mapping systems 104 (MS 1 over partner SP 1 and MS 2 over partner SP 2) for resolution. Each map system 104 responds as follows. MS 1 responds with a positive reply, the specific locator for the remote site on the partner 1 SPs network. MS 2 responds with a negative reply, pointing to the gateway for default routing. The CPE 98 uses the positive map reply and ignores the negative map reply. The preferred path is via the connection A link to partner 1, which would provide optimal routing between the sites.

Traffic leaving the customer CPE site 96 destined to a site on partner 2 SP network 94 will not have a specific route and will activate a Map and Encap process, which queries both mapping systems 104 (MS 1 over partner SP 1 and MS 2 over partner SP 2) for resolution. Each mapping system responds as follows. MS 2 responds with a positive reply, the specific locator for the remote site on the partner 2 SPs network. MS 1 responds with a negative reply, pointing to the gateway for default routing. The CPE 98 uses the positive map reply and ignores the negative map reply. The preferred path is via the connection B link to partner 2, which provides optimal routing between the sites.

Traffic leaving the customer site 96 destined to a site on primary SP's MPLS VPN network 92 will not have a specific route and will activate a Map and Encap process, which queries both mapping systems 104 (MS 1 over partner SP 1 and MS 2 over partner SP 2) for resolution. Each mapping system 104 responds with negative replies, pointing to the respective gateways 100 for default routing. The CPE 98 can use either one of gateways 100, or both gateways in a load balanced (per flow) manner, thus sending packets over both connections.

Traffic leaving the customer site 96 destined to an Internet location will not have a specific route and will activate a Map and Encap process, which queries both mapping systems 104 (MS 1 over partner SP 1 and MS 2 over partner SP 2) for resolution. Each map system 104 responds with negative replies, pointing to the respective gateways 100 for default routing. The CPE 98 can use either one of the gateways 100, or both of the gateways in a load balanced (per flow) manner, thus sending packets over both connections.

In one example, the system functionally operates as follows during connection failure conditions. Assuming a failure of connection A, the eBGP session with the partner 1 SP is down and the connection to MS 1 is down. All traffic traverses connection B with partner 2. The mapping system (MS 2) responds with the specific locator for the remote site on partner 2 network. If unknown (destined to a native MPLS VPN site on the primary SPs network, a location on partner 1's network, or to the Internet), the mapping system 104 responds to the CPE 98 to use the Map and Encap GW 2 as a default gateway. If the remote locator is on partner 1's network, the overlay tunnel terminates on GW 2, traverses the primary provider's MPLS VPN network, and is then re-encapsulated by GW 1 for overlay transit through the partner 1 network 94.

Assuming a failure of connection B, the eBGP session with the partner 2 SP is down and the connection to MS 2 is down. All traffic traverses connection A with partner 1. The mapping system (MS 1) responds with the specific locator for the remote site on partner 1 network. If unknown (destined to a native MPLS VPN site on the primary SPs network, a location on partner 2's network or to the Internet), the mapping system responds to the CPE 98 to use the Map and Encap GW 1 as a default gateway. If the remote locator is on partner 2's network, the overlay tunnel terminates on GW 1, traverses the primary provider's MPLS VPN network, and is then re-encapsulated by GW 2 for overlay transit through the partner 2 network.

Multi-homing examples are described further below with respect to the network shown in FIG. 10.

Multi-Home to Partner VPN and MPLS VPN

One or more embodiments enable a service provider (SP) based virtual private network multi-homing solution, where one connection is provided by the SPs traditional MPLS VPN network and the other connection is provided by an IP Map and Encap system over a diversely routed IP network (either provided by the same SP or a partner SP). By having diverse access connections for a customer site, overall resiliency and redundancy is enhanced. The IP Map and Encap system also allows for feature consistency with the MPLS VPN network without incurring additional requirements for the underlying partner SP routed IPv4 network.

Customers needing diverse access over multiple carrier networks may be best served in an environment where there are heterogeneous access networks with multiple service providers. However, complex coordination and service mismatches make this a challenging architecture. By having an IPv4 Map and Encap system approach for the secondary connection, only basic IPv4 transport is needed from the secondary provider, yet full routing resiliency and connectivity is maintained with advanced feature parity (e.g., multicast, IPv6, QoS markings) due to the overlay encapsulation.

The following describes how a Map and Encap system can be used to inter-work with traditional MPLS VPN services to provide an enhanced resiliency solution.

In one example, a primary SP runs an MPLS VPN network and runs an IP Map and Encap system as an overlay with a secondary SP's network. If an enterprise customer that has contracted for VPN services from the primary SP needs a multi-homed site for high availability purposes with diverse access connections, the primary SP can provide a direct connection between its MPLS VPN Provider Edge and the customer CPE and contract with a partner SP to provide a second connection between the partner SPs network and the customer's CPE. In order to minimize inter-working issues and provide the proper VPN connectivity, a Map and Encap system is used over the partner network. The partner SP only needs to provide basic IP routed services (via any standard means including MPLS VPNs). The primary SP can use the scalable Map and Encap system over the partner connection to minimize complex partner network routing and service needs. A Map and Encap gateway between the primary SPs MPLS VPN network and the partner SP's IP network provides the interworking.

The following describes an example of a dual-homed CPE device at the end customer site. The primary SP has deployed an IPv4 Map and Encap gateway between itself and a partner SP, along with a mapping system. The primary SP uses a stateless and scalable overlay encapsulation architecture over the partner's network to bind users to the appropriate MPLS VPN VRFs inside the primary SPs network. The CPE at the customer site has two WAN connections, connection A to the primary SP via traditional MPLS VPN PE-CE means (with this connection bound to a customer VRF inside the PE) (e.g., link 69 in FIG. 6) and connection B to the secondary SP, where the secondary SP is providing some type of basic private IPv4 routing service (e.g., MPLS VPN or other) (e.g., connection B in FIG. 9).

In this example, the CPE has an eBGP session with the primary SP's PE over connection A and learns the routing information via traditional means for other customer sites natively connected to the MPLS VPN. The CPE also has an eBGP session with the secondary SP's PE over connection B and learns just the locator information of any of the same customer sites also connected to the secondary SP along with the IPv4 locator information of the mapping system and the deployed Map and Encap gateway between the primary SP and the secondary SP.

The CPE runs its Map and Encap function only over the connection B interface and registers its endpoint prefixes with the appropriate locators in the mapping system.

In one example, the system functionally operates as follows during non-failure conditions. Traffic leaving the customer site destined to a site on primary SP's MPLS VPN network will have a specific route (a default route (0/0) is not considered a specific route match) learned via the connection A eBGP session. Traffic leaving the customer site destined to a site on the secondary SP's network will not have a specific route and thus will activate a Map and Encap process, which queries the map system for resolution. The map system will respond with the specific locator for the remote site on the secondary SPs network. Traffic leaving the customer site destined to an Internet location will not have a specific route and thus will activate a Map and Encap process, which queries the map system for resolution. The map system will respond to the CPE to use the Map and Encap gateway as a default GW.

In one example, the system functionally operates as follows during connection failure conditions. Assuming a failure of connection A, the eBGP session with the primary SP is down and there will be no specific route information in the CPE. The traffic activates a Map and Encap process, which queries the mapping system for resolution. The mapping system will respond with the specific locator for the remote site on the secondary SP's network, or if unknown, the map system will respond to the CPE to use the Map and Encap gateway as a default GW.

Assuming a failure of connection B, the eBGP session with the primary SP is down and there will is no connectivity to the Map and Encap system control plane components. The Map and Encap process is down. Traffic leaving the customer site destined to a site on primary SP's MPLS VPN network will have a specific route using connection A. All other traffic uses the default route (0/0) learned via the connection A eBGP session.

Multi-homing examples are described further below with respect to the network shown in FIG. 10.

Multi-Home CE to Partner VPN and MPLS VPN or Multiple MPLS VPNs

The following describes an example of a network that may be used to multi-home a CE device to partner VPN and MPLS VPN (as described above) or multiple MPLS VPNs (as described above).

Figure 10:
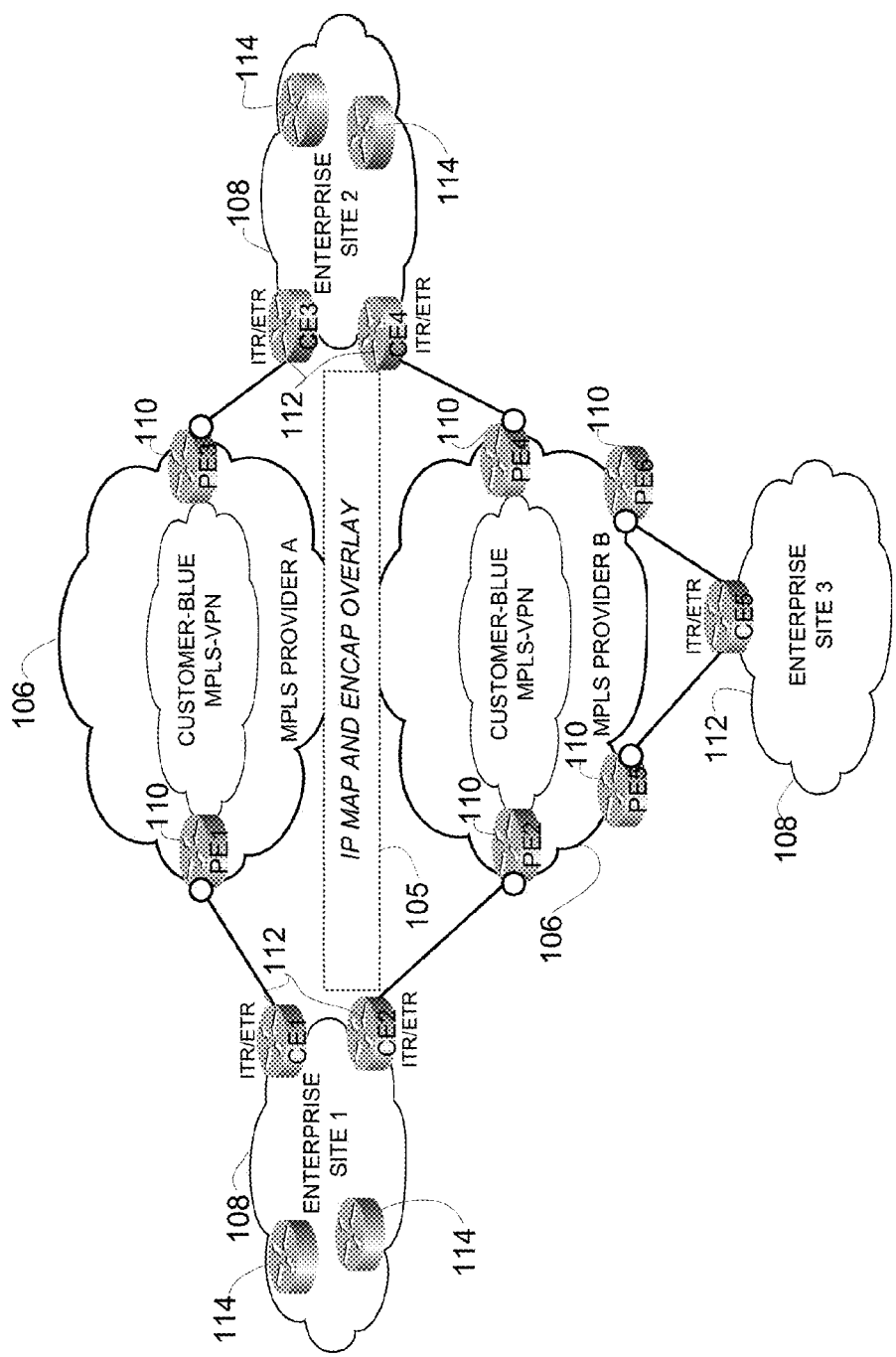
FIG. 10 illustrates multi-homed connections to multiple MPLS VPN core networks with a Map and Encap overlay system, in accordance with one embodiment.

The network shown in FIG. 10 illustrates the use of an IP Map and Encap system that simplifies complexities associated with multi-homed connections across multiple (disjointed) MPLS VPN core networks. Two MPLS provider networks 106 (MPLS provider A and MPLS provider B) are both in communication with enterprise sites 108 (site 1 and site 2). MPLS provider B is also in communication with enterprise site 3. Provider edge devices 110 (PE1, PE2, PE3, PE4, PE5, PE6) are in communication with CE devices 112 (CE1, CE2, CE3, CE4, CE5) at enterprise sites 1, 2, and 3. The enterprise sites 108 may include any number of network devices 114 (e.g., routers, switches). Enterprise sites 1 and 2 each include at least two access connections, with each provided by a different MPLS provider.

An IP Map and Encap overlay 105, as described above, administered by a primary SP is used over the diversely routed IP networks to provide consistent services and routing with the primary SP's other MPLS VPN sites. By having diverse access connections (across multiple provider networks) for a customer site, overall resiliency and redundancy is enhanced.

The enterprise customer may, for example, contract for VPN services from the primary SP and need a multi-homed site for high availability purposes with diverse connections. The primary SP may provide a direct connection between its MPLS VPN provider edge and the customer CPE but also contract with a partner SP to provide a second connection between the partner SP's network and the customer's CPE. The partner SP only needs to provide basic routed services (e.g., IPv4) via any standard means including MPLS VPNs. The primary SP uses the scalable Map and Encap system over the partner connection to minimize complex partner network routing and service needs. One example of a dual-homed CPE device at the end customer site to both a partner VPN and an MPLS VPN are described above.

The enterprise customer may also, for example, contract for VPN services from the primary SP and need a multi-homed site for high availability purposes with diverse access connections in a geography where there is no physical connectivity to the primary SP. In this case, the primary SP can contract with a partner SP to provide a private IPv4 service, for example, with a connection between the partner SP network and the customer's CPE and also contract with another partner SP to provide a private IPv4 service with a second connection between the second partner SP network and the customer's CPE. One example of a dual-homed CPE device at the end customer site to multiple MPLS VPNs is described above.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving from a plurality of customer edge devices, endpoint addresses at a central mapping system operating as a control plane for a provider network in communication with a plurality of customer networks; and
   mapping the endpoint addresses to provider edge devices in the provider network;
   wherein the customer edge devices store customer endpoint routes for active flows and the provider edge devices store customer edge device site locator addresses for use in a mapping and encapsulation overlay in the provider network.

2. The method of claim 1 wherein the customer edge device site locator addresses identify provider edge to customer edge links within one or more access networks.

3. The method of claim 1 wherein the customer edge devices comprise virtual customer edge devices within one or more access networks.

4. The method of claim 1 further comprising multiplexing multiple virtual private networks over a single virtual private network virtual routing and forwarding instance.

5. The method of claim 1 wherein the mapping system identifies a failure learned via Border Gateway Protocol (BGP) and removes associated endpoint addresses.

6. The method of claim 1 wherein the provider network comprises a primary service provider network and a secondary service provider network.

7. The method of claim 1 wherein one of the customer edge devices is multi-homed to the provider network via secondary provider networks each in communication with the provider network through a gateway in communication with the mapping system.

8. The method of claim 1 wherein the provider network comprises an MPLS (Multiprotocol Label Switching) network and each of the customer networks are associated with a virtual private network.

9. An apparatus comprising:
   a processor for processing endpoint addresses received from a plurality of customer edge devices at a central mapping system operating as a control plane for a provider network in communication with a plurality of customer networks, and mapping the endpoint addresses to provider edge devices in the provider network; and
   memory for storing the endpoint addresses;
   wherein the customer edge devices store customer endpoint routes for active flows and the provider edge devices store customer edge device site locator addresses for use in a mapping and encapsulation overlay in the provider network.

10. The apparatus of claim 9 wherein the customer edge device site locator addresses identify provider edge to customer edge links within one or more access networks.

11. The apparatus of claim 9 wherein the customer edge devices comprise virtual customer edge devices within one more access networks.

12. The apparatus of claim 9 wherein the processor is further operable to multiplex multiple virtual private networks over a single virtual private network virtual routing and forwarding instance.

13. The apparatus of claim 9 wherein the mapping system is operable to identify a failure learned via Border Gateway Protocol (BGP) and remove associated endpoint addresses.

14. The apparatus of claim 9 wherein the processor is further configured to process changes to customer endpoint addresses and store in the memory of the mapping system.

15. The apparatus of claim 9 wherein one of the customer edge devices is multi-homed to the provider network via secondary provider networks each in communication with the provider network through a gateway in communication with the mapping system.

16. The apparatus of claim 9 wherein the provider network comprises an MPLS (Multiprotocol Label Switching) network and each of the customer networks are associated with a virtual private network.

17. Logic encoded on one or more tangible computer readable media for execution and when executed operable to:
   receive from a plurality of customer edge devices, endpoint addresses at a central mapping system operating as a control plane for a provider network in communication with a plurality of customer networks; and
   map the endpoint addresses to provider edge devices in the provider network;
   wherein the customer edge devices store customer endpoint routes for active flows and the provider edge devices store customer edge device site locator addresses for use in a mapping and encapsulation overlay in the provider network.

18. The logic of claim 17 wherein the customer edge device site locator addresses identify provider edge to customer edge links within one or more access networks.

19. The logic of claim 17 wherein the customer edge devices comprise virtual customer edge devices within one more access networks.

20. The logic of claim 17 wherein the provider network comprises an MPLS (Multiprotocol Label Switching) network and each of the customer networks are associated with a virtual private network.

* * * * *